United States Patent Office 3,436,456
Patented Apr. 1, 1969

3,436,456
STABILIZED MANGANESE ETHYLENE BISDI-
THIOCARBAMATE AND PROCESS
Melis N. Louis and Deszö Weingarten, Vlaardingen,
Netherlands, assignors to N.V. Fabriek Van Chemische
Producten Vondelingenplaat, Rotterdam, Netherlands,
a corporation of the Netherlands
No Drawing. Filed May 12, 1967, Ser. No. 637,904
Claims priority, application Netherlands, May 13, 1966,
6606622
Int. Cl. A01n 9/12; C07f 13/00
U.S. Cl. 424—249                                           4 Claims

ABSTRACT OF THE DISCLOSURE

Manganese ethylene bisdithiocarbamate and its formulations stabilized with dinitrosopentamethylene tetramine.

It is known that most metal salts of alkylene bisdithiocarbamic acids are not stable at elevated temperature and this is indicated by evolution of carbon disulfide and a decrease in the fungicidal activity of these materials. These phenomena of instability also occur during long storage.

Manganese ethylene bisdithiocarbamate (Maneb) shows these disadvantages to a greater extent than the corresponding other metal salts. It is also known that manganese ethylene bisdithiocarbamate can ignite spontaneously during its manufacture. Furthermore, other decomposition phenomena have been noted such as discoloration or charring and this occurs especially on storage at elevated temperatures.

Numerous stabilizers for manganese ethylene bisdithiocarbamate have been proposed. In U.S. patent specification 2,665,285 the use of inorganic sulfites of sodium or calcium is recommended. Thiourea is also known as a stabilizer for an aqueous solution of the manganese salt of ethylene bisdithiocarbamate acid. Both methods, however, require storage free of air.

In German patent specification 1,113,607 (and U.S. 2,974,156) hexamethylene tetramine has been described as a stabilizer for manganese ethylene bisdithiocarbamate in the presence of air. In Dutch patent application 288,639 mixtures of several metal salts of propylene bisdithiocarbamic have been described and the unstable manganese salt is shown to be stabilized by other metal salts present. French patent specification 1,344,342 indicates the use of paraformaldehyde as a stabilizer and French patent specification 1,374,622 indicates the use of ortho, meta or paraphenylene diamine for stabilizing manganese ethylene bisdithiocarbamate.

It has now been found that manganese ethylene bisdithiocarbamate can be stabilized more effectively than heretofore by using as a stabilizer dinitrosopentamethylene tetramine, which compound has the structure

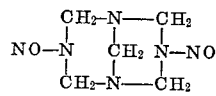

and which is a known compound described in U.S. 2,754,276 as a blowing agent for cellular compositions.

The stabilizing action of dinitrosopentamethylene tetramine has been evaluated by experiments which determine relative ignition periods for manganese ethylene bisdithiocarbamate containing various stabilizers.

In the evaluation procedure, the dinitrosopentamethylene tetramine stabilizer is used in an amount of 2% by weight, based on the dry manganese ethylene bisdithiocarbamate, and it is added in the form of a 5% by weight solution of equal parts by volume of water and acetone to a paste of the bisdithiocarbamate containing between 20 and 30% by weight of water. The other stabilizers used in the test are added in the same amount as a 10% by weight aqueous solution. After mixing the manganese ethylene bisdithiocarbamate and stabilizer, the mixture is dried at 60° C. under reduced pressure until the water content has been reduced below 0.5% by weight.

Of the sample mixture obtained in this way 15 grams is introduced into a large test tube and the tube placed in an oil bath maintained at 140° C. After a time ignition occurs and then the contents of the tube are poured out where glowing and smouldering of the mixture in the air continues. The ignition period is the time of heating in the oil bath prior to the beginning of burning and is measured in minutes. Although the method is simple, it is quite reproducible.

The results of a large number of experiments are shown in Table I which follows:

TABLE I

| Stabilizer: | Ignition period in minutes |
|---|---|
| Control | 23 |
| (1) o-Phenylenediamine | <20 |
| (2) β-Naphthylamine | <20 |
| (3) Monomethylolurea | <20 |
| (4) Phenothiazine | 23 |
| (5) 2,6-di-tert. butyl p-cresol | 23 |
| (6) N-butyl p-aminophenol | 27 |
| (7) Pyrogallol | 21–30 |
| (8) o-Aminophenol | 30–40 |
| (9) Mercaptobenzothiazole | 31–40 |
| (10) Mercaptobenzimidazole | 40–50 |
| (11) 4-methylaminophenolsulfate | 40–50 |
| (12) p-Aminophenol | 60 |
| (13) Sodium salt of methylamino methanesulfonic acid | <60 |
| (14) Hexamethylene tetramine | 180 |
| (15) Dinitrosopentamethylene tetramine | 240 |

As can be seen from the table, the excellent stabilizing effect of dinitrosopentamethylene tetramine is clearly evident.

A number of experiments were carried out to determine the decrease in manganese ethylene bisdithiocarbamate content during drying and storage of various stabilized compositions. For comparative purposes hexamethylenetetramine, a known stabilizer, was used also. Stabilizers were added to (1) a paste containing about 25% by weight of water and which was obtained by centrifuging an aqueous manganese ethylenebisdithiocarbamate suspension, (2) solid manganese ethylene bisdithiocarbamate dihydrate, and (3) completely anhydrous manganese ethylene bisdithiocarbamate.

The hexamethylene tetramine (HMT) was added as a powder and as a 10% by weight solution in water. The dinitrosopentamethylene tetramine (DPT) was added as a powder and as a 5% by weight solution in a mixture of equal parts by volume of water and acetone. Where necessary, the mixtures were dried until the water content was below 0.5% by weight. The decrease in the amount of manganese ethylene bisdithiocarbamate after storage of the dried mixture at 90° C. (atmospheric pressure) after 48 hours and 200 hours respectively was determined. In a second test, there was determined the decrease of the manganese ethylene bisdithiocarbamate content due to a combination of drying at 60° C. at 50 to 100 mm. Hg plus storage at elevated temperature (90° C.) for 48 and 200 hours respectively. These results are shown in Table II and the values in the tables are based on the arbitrary value of 100 for the decrease of manganese ethylene bisdithiocarbamate content in the absence of stabilizer. The results of the comparative experiments shown in Table II indicate the excellent stabilizing action of the dinitrosopentamethylene tetramine and show a surprising superiority over hexamethylene tetramine.

TABLE II

| Amount of stabilizer based on Anhydrous Maneb (percent by weight) | Form of Maneb | Stabilizer | | | | Stabilizer | | | |
|---|---|---|---|---|---|---|---|---|---|
| | | HMT(S) | HMT(P) | DPT(S) | DPT(P) | HMT(S) | HMT(P) | DPT(S) | DPT(P) |
| | | Decrease of Maneb content after storage of Maneb plus stabilizer for 48 hours at 90° C. | | | | Decrease of Maneb content after storage of Maneb plus stabilizer for 200 hours at 90° C. | | | |
| 2 | Maneb paste | 39 | 68 | 18 | 42 | 50 | 79 | 19 | 55 |
| 1 | | 53 | 88 | 26 | 65 | 69 | 93 | 44 | 56 |
| 0.5 | | 72 | 100 | 32 | 77 | 80 | 95 | 61 | 60 |
| 0 | | 100 | 100 | 100 | 100 | 100 | 100 | 100 | 100 |
| 2 | Maneb 2.H₂O | 81 | 86 | 5 | 57 | 73 | 78 | 28 | 69 |
| 1 | | 84 | 100 | 19 | 61 | 77 | 85 | 54 | 78 |
| 0.5 | | 100 | 100 | 68 | 84 | 94 | 89 | 77 | 87 |
| 0 | | 100 | 100 | 100 | 100 | 100 | 100 | 100 | 100 |
| 2 | Maneb 0.H₂O | 30 | 38 | 22 | 25 | 41 | 74 | 27 | 43 |
| 1 | | 49 | 55 | 28 | 45 | 55 | 78 | 41 | 60 |
| 0.5 | | 57 | 60 | 32 | 46 | 57 | 82 | 45 | 64 |
| 0 | | 100 | 100 | 100 | 100 | 100 | 100 | 100 | 100 |
| | | Decrease of Maneb content after drying and storage for 48 hrs. | | | | Decrease of Maneb content after drying and storage for 200 hrs. | | | |
| 2 | Maneb paste | 74 | 70 | 60 | 89 | 75 | 81 | 48 | 61 |
| 1 | | 84 | 89 | 70 | 89 | 81 | 94 | 62 | 81 |
| 0.5 | | 86 | 100 | 70 | 100 | 88 | 95 | 83 | 81 |
| 0 | | 100 | 100 | 100 | 100 | 100 | 100 | 100 | 100 |
| 2 | Maneb 2.H₂O | 100 | 87 | 67 | 74 | 100 | 79 | 67 | 75 |
| 1 | | 100 | 100 | 70 | 77 | 100 | 84 | 82 | 81 |
| 0.5 | | 100 | 100 | 91 | 95 | 100 | 90 | 91 | 90 |
| 0 | | 100 | 100 | 100 | 100 | 100 | 100 | 100 | 100 |
| 2 | Maneb 0.H₂O | 94 | 52 | 84 | 57 | 91 | 84 | 87 | 67 |
| 1 | | 100 | 71 | 86 | 71 | 97 | 86 | 90 | 78 |
| 0.5 | | 100 | 77 | 100 | 72 | 100 | 97 | 98 | 82 |
| 0 | | 100 | 100 | 100 | 100 | 100 | 100 | 100 | 100 |

Legend:
HMT(S)—Hexamethylene tetramine solution.
HMT(P)—Hexamethylene tetramine powder.
DPT(S)—Dinitroso pentamethylene solution.
DPT(P)—Dinitroso pentamethylene powder.

Fungicidal compositions containing the stabilized manganese bis dithiocarbamate may be prepared in the usual way of making fungicidal compositions. The stabilizer together with the manganese ethylene bis dithiocarbamate can be mixed with one or more liquid or solid carriers and, if desired, with one or more of the usual components of fungicidal compositions, such as dispersing, emulsifying and/or wetting agents. The stabilizer can also be added to a prepared composition of manganese ethylene bis dithiocarbamate. The amount of manganese ethylene bis dithiocarbamate in the stabilized composition depends upon the particular end use and may vary from 10 to 90% by weight. When used for the treatment of crops the compositions are generally diluted with suitable diluting agents to obtain the desired concentrations of active ingredient.

The stabilizing amount of dinitrosopentamethylene tetramine will generally be from about 0.1 to about 5% by weight and preferably from 0.5 to 2% by weight based on the manganese ethylene bis dithiocarbamate. It will be understood that greater amounts may be used and these amounts are employed both when stabilizing the bis dithiocarbamate as such and when preparing stabilized fungicidal compositions.

The fungicidal action of the stabilized manganese ethylene bis dithiocarbamate either above or in the form of a formulation is not affected by the addition of dinitrosopentamethylene tetramine.

We claim:
1. Manganese ethylene bisdithiocarbamate containing a stabilizing amount of dinitrosopentamethylene tetramine.
2. A fungicidal composition comprising 10 to 90% by weight of manganese ethylene bisdithiocarbamate and from 0.1 to about 5% by weight of the manganese ethylene bisdithiocarbamate of dinitrosopentamethylene tetramine.
3. A process for stabilizing manganese ethylene bisdithiocarbamate which comprise adding as a stabilizer from about 0.1 to about 5% by weight of the manganese ethylene bisdithiocarbamate of dinitrosopentamethylene tetramine.
4. A process for preparing a fungicidal composition containing manganese ethylene bisdithiocarbamate which comprises adding to said composition a stabilizing amount of dinitrosopentamethylene tetramine.

References Cited

UNITED STATES PATENTS 2,974,156  3/1961  Sobatzki _____ 260—429

TOBIAS E. LEVOW, Primary Examiner.

A. P. DEMERS, Assistant Examiner.

U.S. Cl. X.R.

260—429, 999; 424—286